(12) United States Patent
Yang (10) Patent No.: US 10,775,867 B2
(45) Date of Patent: Sep. 15, 2020

(54) ELECTRONIC DEVICE AND CONTROL METHOD THEREFOR

(71) Applicant: ASUSTeK COMPUTER INC., Taipei (TW)

(72) Inventor: Chih-Hsien Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/367,351

(22) Filed: Mar. 28, 2019

(65) Prior Publication Data

US 2020/0135079 A1 Apr. 30, 2020

(30) Foreign Application Priority Data

Oct. 31, 2018 (TW) .............................. 107138669 A (51) Int. Cl.
| | |
|---|---|
| *G06F 1/3231* | (2019.01) |
| *G09G 3/20* | (2006.01) |
| *H04N 5/232* | (2006.01) |
| *G06K 9/00* | (2006.01) |

(52) U.S. Cl.
CPC ....... *G06F 1/3231* (2013.01); *G06K 9/00255* (2013.01); *G09G 3/20* (2013.01); *H04N 5/23229* (2013.01); *G09G 2330/021* (2013.01)

(58) Field of Classification Search
CPC ........ G06F 21/32; G06F 3/011; G06F 3/0481; G06F 3/0484; G06F 21/31; G06F 1/3203; G06F 1/3265; G06F 1/3228; G06F 1/3231; H04N 5/23212; H04N 5/23219; H04N 1/00896; H04N 1/00891; H04N 5/23245; H04N 21/4436; H04N 21/4223; H04N 5/2258; H04N 5/23241; G06K 15/406; G06K 9/00302; G06K 15/4055; G09G 2330/021; G09G 2330/022
See application file for complete search history.

(56) References Cited

U.S. PATENT DOCUMENTS

| | | | |
|---|---|---|---|
| 8,649,574 B2 | 2/2014 | Mise et al. | |
| 8,994,499 B2 * | 3/2015 | Zhao | G06F 21/32 340/5.83 |
| 2005/0198661 A1 * | 9/2005 | Collins | G06Q 30/02 725/19 |

(Continued)

FOREIGN PATENT DOCUMENTS

| | | |
|---|---|---|
| CN | 105390120 A | 3/2016 |
| CN | 105611078 A | 5/2016 |

(Continued)

*Primary Examiner* — Sanjiv D. Patel
(74) *Attorney, Agent, or Firm* — McClure, Qualey & Rodack, LLP (57) ABSTRACT

The disclosure discloses an electronic device. The electronic device includes a display interface, an image capturing apparatus, a memory, and a processor. The memory stores a program command. The processor is configured to execute the stored program command to perform the following steps: controlling the image capturing apparatus to capture an image; detecting a face area in the image, wherein a relative status between the face area and the image exists; comparing the relative status with a preset status; and when the relative status meets the preset status, controlling the display interface to be in a first mode.

14 Claims, 6 Drawing Sheets

(56) References Cited

U.S. PATENT DOCUMENTS

| | | | | |
|---|---|---|---|---|
| 2011/0234784 A1* | 9/2011 | Sugino | ............... | H04N 21/4223 |
| | | | | 348/77 |
| 2011/0254691 A1* | 10/2011 | Ooi | ......................... | G09G 5/10 |
| | | | | 340/635 |
| 2013/0055001 A1* | 2/2013 | Jeong | ................... | G06F 1/3228 |
| | | | | 713/323 |
| 2013/0258087 A1* | 10/2013 | Jeong | ...................... | H04M 1/23 |
| | | | | 348/77 |
| 2013/0342669 A1* | 12/2013 | Hsu | ................... | G06K 9/00228 |
| | | | | 348/77 |
| 2017/0063852 A1* | 3/2017 | Azar | .................... | H04W 12/06 |
| 2018/0367656 A1* | 12/2018 | Kim | ........................ | H04M 1/67 |
| 2019/0007605 A1* | 1/2019 | Choe | ................... | G06F 9/5011 |

FOREIGN PATENT DOCUMENTS

| | | |
|---|---|---|
| CN | 102999162 B | 8/2016 |
| CN | 106793023 A | 5/2017 |
| EP | 2515526 A2 | 10/2012 |
| TW | 200808043 A | 2/2008 |
| TW | 201204035 A | 1/2012 |
| TW | 201306573 A | 2/2013 |

\* cited by examiner

ELECTRONIC DEVICE AND CONTROL METHOD THEREFOR

CROSS-REFERENCE TO RELATED APPLICATION

This application claims the priority benefit of Taiwan application serial No. 107138669, filed on Oct. 31, 2018. The entirety of the above-mentioned patent application is hereby incorporated by reference herein and made a part of the specification.

BACKGROUND OF THE INVENTION

Field of the Invention

The disclosure relates to an electronic device and a control method therefor.

Description of the Related Art

Mobile devices have been an indispensable part of life. Power control and management for the Mobile devices is quite important to satisfy users' long-time usage.

BRIEF SUMMARY OF THE INVENTION

According to the first aspect, an electronic device is provided herein. The electronic device includes a display interface, an image capturing apparatus, a memory, and a processor. The memory stores a program command. The processor is coupled to the display interface, the image capturing apparatus, and the memory. The processor is configured to execute the stored program command to perform the following steps of a control method: controlling the image capturing apparatus to capture an image; detecting a face area in the image, wherein a relative status between the face area and the image exists; comparing the relative status with a preset status; and controlling the display interface to be in a first mode when the relative status meets the preset status.

According to the second aspect of the disclosure, a control method applied to an electronic device is provided herein. The electronic device includes a display interface. The control method includes: capturing an image; detecting a face area in the image, wherein a relative status between the face area and the image exists; comparing the relative status with a preset status; and controlling the display interface to be in a first mode when the relative status meets the preset status.

Based on the foregoing embodiments, according to the electronic device and the control method therefor in the disclosure, a behavior of a user is effectively determined, to further control on/off of the display interface, thereby saving power while ensuring user experience.

DETAILED DESCRIPTION OF THE EMBODIMENTS

The terms "first", "second" and the like as used herein are used for distinguishing between similar elements or operations and not necessarily for describing a sequence, either temporally, spatially, in ranking or in any other manner.

As used herein, "coupled" or "connected" may mean that two or more elements are in direct physical contact or that two or more elements are not in direct contact with each other but yet still co-operate or interact with each other.

Figure 1:
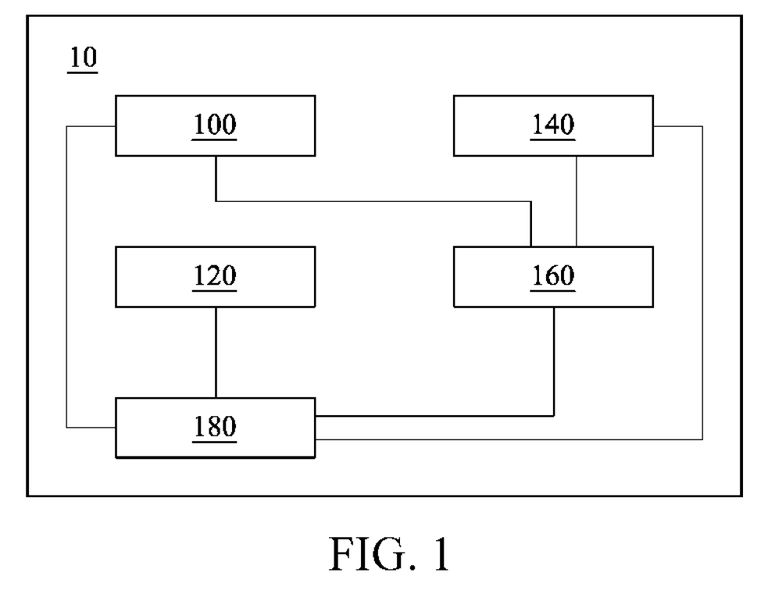
FIG. 1 is a schematic diagram of an electronic device according to some embodiments of the disclosure.

Referring to FIG. 1, FIG. 1 is a schematic diagram of an electronic device according to some embodiments of the disclosure. In an embodiment of the disclosure, the electronic device 10 includes a display interface 100, an image capturing apparatus 120, a memory 140, a processor 160, and a power supply module 180. In some embodiments, the electronic device 10 is a smartphone, a tablet computer, or a notebook computer, but this is not limited thereto. In some embodiments, the processor 160 includes but is not limited to a single processing unit, an integration of a plurality of microprocessors, or an application-specific integrated circuit. The single processing unit or the integration of microprocessors is electrically coupled to the memory 140. The memory 140 is an internal memory, an external memory or a non-transitory memory. In this embodiment, the processor 160 executes at least one program command stored in the memory 140 to further implement a control method defined by the at least one program command. For ease of understanding, the control method defined by the at least one program command is described in detail in the following paragraphs. It should be understood that, the foregoing implementations of the processor 160 are merely examples, and hardware elements such as circuits or modules that execute the processor 160 are all fall within the scope of the disclosure.

In some embodiments, in addition to storing the at least one program command, the memory 140 further stores data required by the processor 160 to execute the program command, and stores (or temporarily stores) data generated after the processor 160 executes the program command.

In some embodiments, the display interface 100 is hardware components in the electronic device 10 and is disposed on a side of the electronic device 10 to display an image. In an embodiment, the display interface 100 is a liquid crystal display or an organic light-emitting diode display of the electronic device 10, and has a touch sensing function. In some embodiments, the display interface 100 includes a displayer and an integration of control software/firmware thereof.

In some embodiments, the image capturing apparatus 120 is a hardware component in the electronic device 10. In an embodiment, the image capturing apparatus 120 is an image capturing array of the electronic device 10, to capture or record at least one image about periphery of the electronic device 10. In some embodiments, the image capturing apparatus 120 includes a front image capturing lens of the electronic device 10. The front image capturing lens is disposed on the electronic device 10 on a side where the display interface 100 is located, to capture an image projected onto the side. It should be understood that, the image capturing apparatus 120 includes related components of a camera or a video camera, for example, a microprocessor, a photosensitive element, an electronic shutter, a flash, or a strobe light. In some embodiments, the image capturing apparatus 120 includes the foregoing components and an integration of control software/firmware thereof.

In some embodiments, the power supply module 180 is a hardware component in the electronic device 10. In an embodiment, the power supply module 180 is a lithium battery of the electronic device 10, and the power supply module 180 stores electricity to provide power to the display interface 100, the image capturing apparatus 120, the memory 140, and the processor 160. In some embodiments, the power supply module 180 includes a battery and an integration of control software/firmware thereof. In an embodiment, the power supply module 180 adapts a corresponding power supply module management program. The power supply module management program operates on the processor 160.

The foregoing implementations of the electronic device 10 are merely examples, and various other software/hardware elements that perform same functions or operations are also fall within the scope of the disclosure. In an embodiment, the image capturing apparatus 120 is an image capturing array of the electronic device 10, to capture at least one image around the electronic device 10, or at least record the at least one image.

Referring to FIG. 1 to FIG. 4, in an embodiment, the processor 160 controls the display interface 100 to be in a first mode. In this embodiment, the first mode is a display mode. It should be understood that, the display mode herein refers to that the display interface 100 is in an enable mode that displays an image. In this mode, the processor 160 displays an image by the display interface 100, and a user views the images on the display interface 100.

Figure 2:
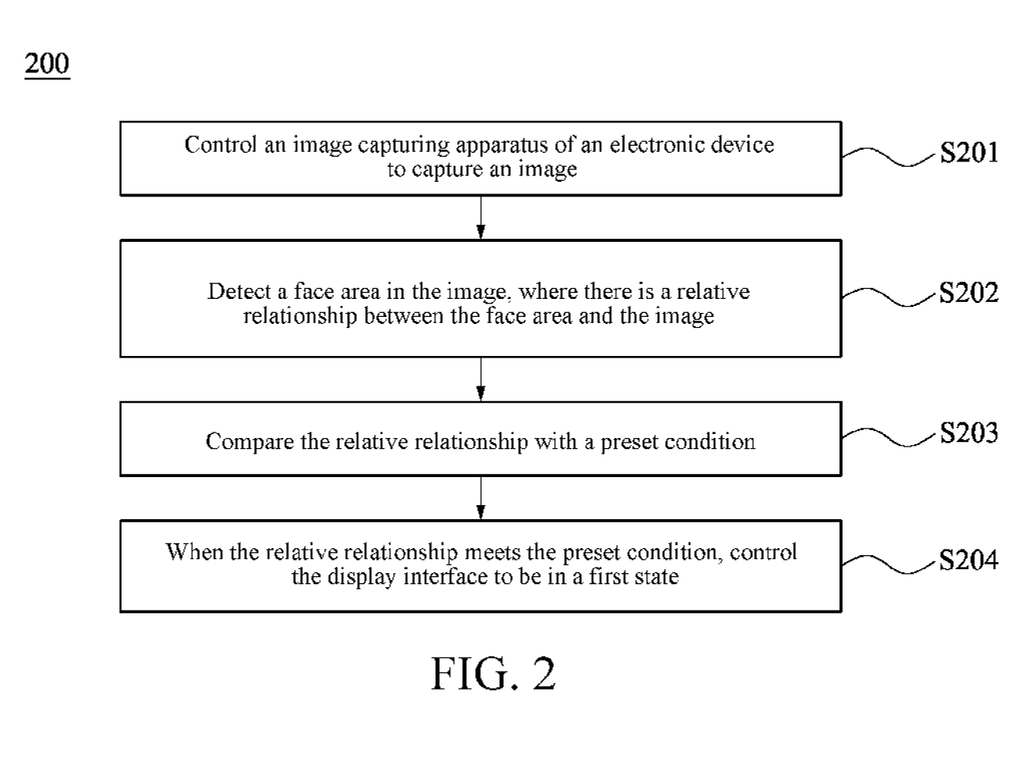
FIG. 2 is a flowchart of a control method according to some embodiments of the disclosure.

Referring to FIG. 1 and FIG. 2, in some embodiments, the processor 160 obtains a non-operation time of the electronic device 10, and the non-operation time is accumulated time in which the user does not perform an operation behavior on the electronic device 10. The non-operation time is also understood as inactivity time of the electronic device 10. In an embodiment, when the non-operation time exceeds a power-saving time threshold, the processor 160 controls the display interface 100 to be in a second mode. In this embodiment, the second mode is a power saving mode, to reduce power consumption of the power supply module 180. In some embodiments, the power saving mode at least includes a sleeping mode and a dim mode. The sleeping mode refers to that the display interface 100 is in a disable mode that does not display an image. In this mode, the processor 160 does not display the images by using the display interface 100. It should be understood that, in some embodiments, when the display interface 100 is in the sleeping mode, the display interface 100 does not display the image, but the processor 160 still performs the one or more applications.

Referring to FIG. 1 to FIG. 4, in some embodiments, the power saving mode includes a dim mode. The dim mode herein refers to that the display interface 100 is still in an enable mode that displays an image, but a display brightness of the display interface 100 in the dim mode is different from that of the display interface 100 in the display mode. Generally, the display brightness of the display interface 100 in the dim mode is less than the display brightness of the display interface 100 in the display mode. It should be understood that, the dim mode of the display interface 100 is a transient mode between the display mode and the sleeping mode. In an embodiment, when the processor 160 determines that the non-operation time exceeds a first time length, the processor 160 switches the display interface 100 from the display mode to the dim mode. In this embodiment, the first time length is used as the power-saving time threshold. In the dim mode, when the processor 160 determines that the non-operation time exceeds a second time length but a control behavior of the user has not be detected by the processor 160, the processor 160 switches the display interface 100 from the dim mode to the sleeping mode. In this way, the processor 160 saves power for the power supply module 180.

In some embodiments, the first time length and the second time length are set by the processor 160. In an embodiment, the user operates the processor 160 by the display interface 100 (or another input apparatus), to set the first time length and the second time length, or set not to switch the display interface 100 to the dim mode or the sleeping mode (that is, set to a never sleeping mode). In an embodiment, the processor 160 provides, by using the display interface 100, options related to setting of the first time length and the second time length to the user for selection. When the user selects at least one of the options, the processor 160 sets the first time length and the second time length based on the at least one option.

Figure 3:
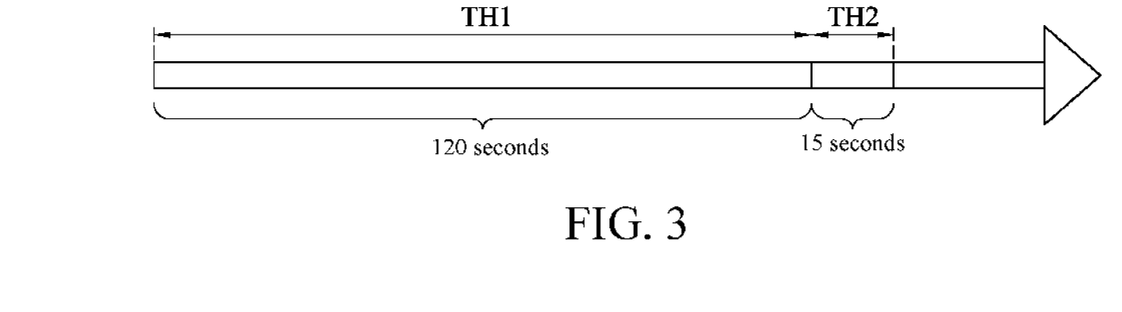
FIG. 3 is a schematic diagram of a time axis of mode switching of a display interface according to some embodiments of the disclosure.

As shown in FIG. 3, in some embodiments, the user operates the processor 160 by using the display interface 100, to set the first time length TH1 to 120 seconds and the second time length TH2 (that is, the transient time from the dim mode to the sleeping mode) to 15 seconds. In this mode, when the processor 160 does not detect the operation behavior of the user in the 120 seconds, the processor 160 switches the display interface 100 to the dim mode. In the dim mode and after 15 seconds passed, if the operation behavior still not detected by the processor 160, the processor 160 switches the display interface 100 to the sleeping mode. In some other embodiments, the user inputs a command to the processor 160 by using the display interface 100, to set the display interface 100 to the never sleeping mode. In this mode, the display interface 100 remains in the display mode until the user actively operates the processor 160 to switch the display interface 100 to the sleeping mode.

In some embodiments, the first time length TH1 (that is, the power-saving time threshold) includes a buffer time range T2. In the buffer time range T2, the processor 160 determines whether the user is still near the electronic device 10 but not operating mode the display interface 100 or the another input apparatus (in an embodiment, the user views an image on the display interface 100 at a specific distance), thereby preventing the display interface 100 from being in the power saving mode. In some embodiments, the processor 160 continuously performs detection and obtains the non-operation time T1 of the display interface 100. When the processor 160 determines that the non-operation time T1 is equal to a value obtained by subtracting a time length of the buffer time range T2 from the first time length TH1, the processor 160 executes a detection program.

Figure 4:
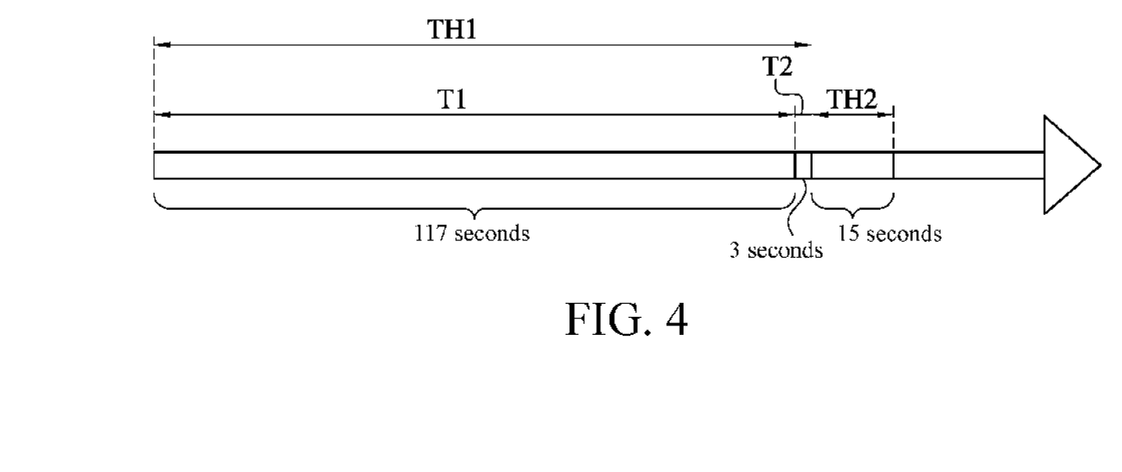
FIG. 4 is a schematic diagram of a time axis of mode switching of a display interface according to some embodiments of the disclosure.

For better understanding, referring to FIG. 4 in the disclosure, in this embodiment, the first time length TH1 (that is, the power-saving time threshold) is 120 seconds, the second time length TH2 is 15 seconds, and a time length of the buffer time range T2 is 3 seconds. In this embodiment, when the non-operation time T1 is accumulated to 117 seconds, the processor 160 determines that the non-operation time T1 plus the time length of the buffer time range T2 equals to the first time length TH1 (that is, a length of the power-saving time threshold). At this time point, the processor 160 executes the detection program. The foregoing numerals such as the 120 seconds, the 15 seconds, the 3 seconds, and the 117 seconds are merely examples, and the first time length TH1, the second time length TH2, the time length of the buffer time range T2, and the non-operation time T1 of the disclosure are not limited thereto.

In some embodiments, the processor 160 executes the detection program to determine whether to perform a subsequent control method. The control method is used to determine whether the user is still near the electronic device 10. In an embodiment, the processor 160 executes the detection program to determine whether the display interface 100 is set to the never sleeping mode. When determining that the display interface 100 is set to the never sleeping mode, the processor 160 determines not to perform the control method. In an embodiment, the processor 160 executes the detection program to determine whether the power supply module of the electronic device 10 is in a low power mode. When the power supply module 180 of the electronic device 10 is in the low power mode, the processor 160 determines not to perform the subsequent control method. In an embodiment, the processor 160 executes the detection program to determine whether the display interface 100 is in a lock-on image. When the display interface 100 is in the lock-on image, the processor 160 determines not to perform the subsequent control method.

In an embodiment, the processor 160 executes the detection program to determine whether the image capturing apparatus 120 is available. When the image capturing apparatus 120 is unavailable (in an embodiment, the image capturing apparatus 120 is occupied by another application), the processor 160 determines not to perform the control method.

In an embodiment, when the processor 160 executes the detection program and determines that the electronic device 10 is not in the low power mode, the display interface 100 is not in the lock-on image, or the image capturing apparatus 120 is not unavailable, the processor 160 controls the image capturing apparatus 120 (in an embodiment, a front lens) to capture at least one image. It should be understood that, the image capturing program includes sub-programs of the image capturing apparatus 120 such as automatic focal-length adjustment or adjustment in exposure level. This is not described herein.

Referring to FIG. 2, in an embodiment of the disclosure, the control method 200 is performed by the electronic device 10 shown in FIG. 1, and therefore reference may be made to the embodiment in FIG. 1. Specifically, the processor 160 executes the at least one program command stored in the memory 140 (in an embodiment, a non-transient readable storage medium) to perform the control method 200. Steps included in the control method 200 are described in detail in the following paragraphs.

Step S201: Control an image capturing apparatus of an electronic device to capture an image.

As described above, in an embodiment, the processor 160 executes the detection program to determine whether the image capturing apparatus 120 is available. In an embodiment, when the image capturing apparatus 120 is available, the processor 160 controls the image capturing apparatus 120 to capture the at least one image.

Step S202: Detect a face area in the image, where there is a relative status between the face area and the image.

In an embodiment, the processor 160 controls the image capturing apparatus 120 to capture the at least one image, and executes a face detection algorithm to detect the face area in the image. In some embodiments, the face detection algorithm includes at least one of a feature based method or an appearance based method. In some embodiments, the face detection algorithm is performed by the processor 160 by executing a related program instruction stored in the memory 140.

Figure 5:
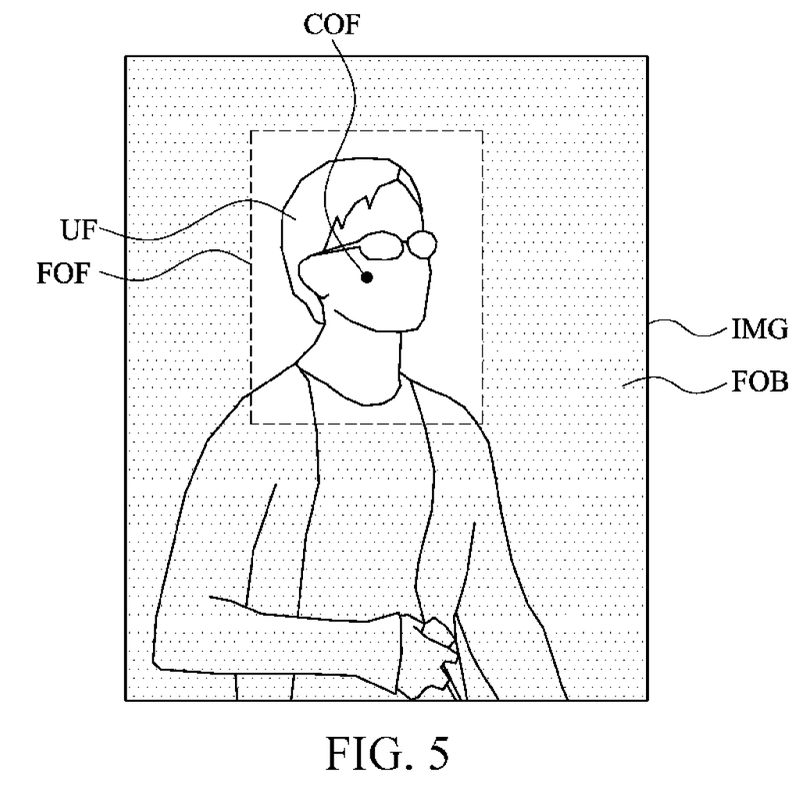
FIG. 5 is a schematic diagram of an image according to some embodiments of the disclosure.

In some embodiments, the face detection algorithm includes an image segmentation algorithm. By using the image segmentation algorithm, the processor 160 defines the face area in the at least one image according to a proper aspect ratio of the face so as to recognize the face area and a background area from the at least one image. For better understanding, referring to FIG. 5 in the disclosure, FIG. 5 is a schematic diagram of an image according to some embodiments of the disclosure. As shown in FIG. 5, the processor 160 controls the image capturing apparatus 120 to capture an image IMG, and the image IMG includes a physical face UF. In this embodiment, the physical face UF is a human face. By using the image segmentation algorithm of the face detection algorithm, the processor 160 defines the face area FOF and the background area FOB in the image IMG. As shown in FIG. 5, the face area FOF has a center COF. It should be understood that, although only a single physical face UF is used as an example in FIG. 5, in some embodiments, depending on setting of the processor 160, a plurality of face areas are also defined in the at least one image by using the face detection algorithm. This is not described herein again.

Step S203: Compare the relative status with a preset status.

In an embodiment, the processor 160 determines that the image includes at least one face area. There is a relative status between the face area and the image. In some embodiments, the relative status is a ratio of pixels occupied by the face area FOF in the image IMG. In an embodiment, when a quantity of pixels forming the entire image IMG is a first quantity, and a quantity of pixels occupied by the face area FOF in the image IMG is a second quantity, a ratio of the second quantity to the first quantity is used to calculate an actual distance between an object corresponding to the face area and the electronic device 10.

Figure 6A:
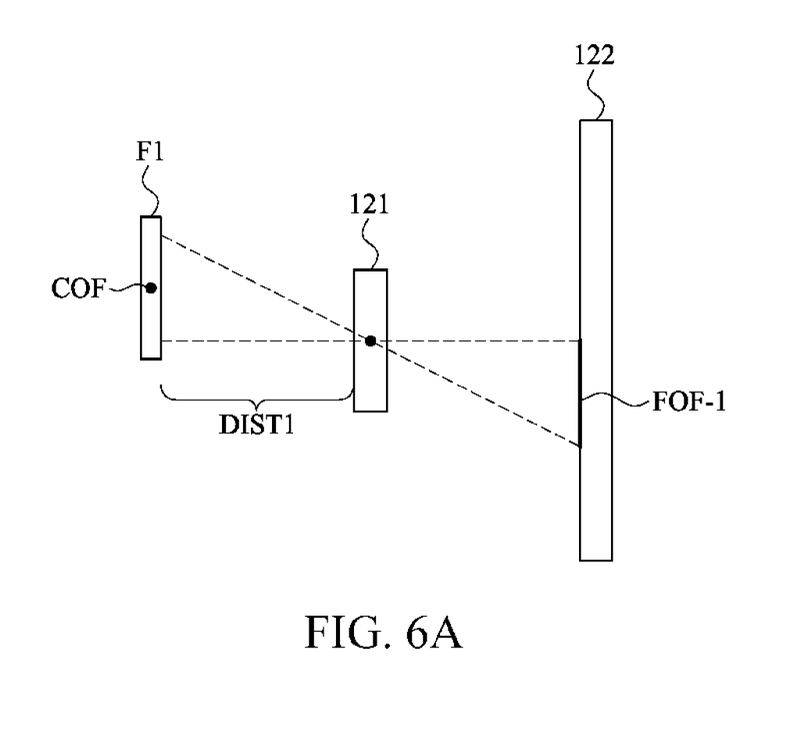
FIG. 6A is a schematic diagram of distance calculation according to some embodiments of the disclosure.
Figure 6B:
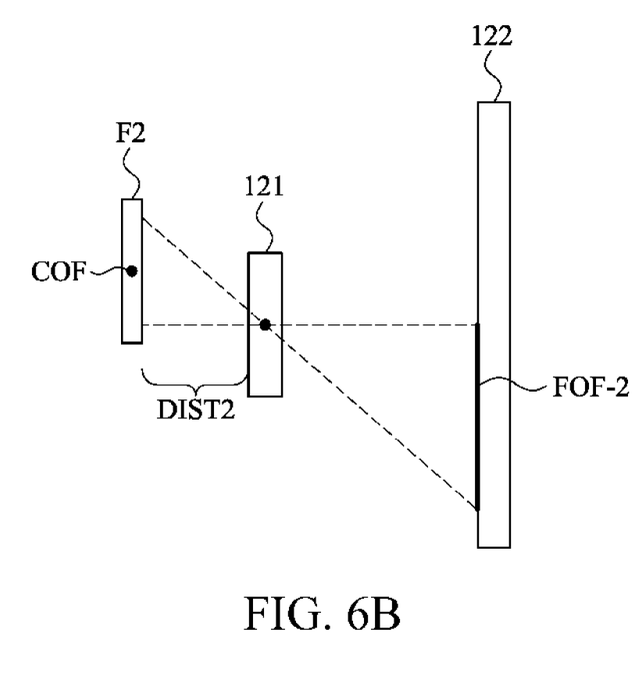
FIG. 6B is a schematic diagram of distance calculation according to some embodiments of the disclosure.

For better understanding, referring to FIG. 6A and FIG. 6B in the disclosure, FIG. 6A and FIG. 6B are schematic diagrams of distance calculation according to some embodiments of the disclosure. As shown in FIG. 6A and FIG. 6B, in some embodiments, the image capturing apparatus 120 has a lens 121 and a photosensitive element 122, and ambient light is incident to the image capturing apparatus 120 through the lens 121, projected onto the photosensitive element 122, and captured by the photosensitive element 122 to be an image.

As shown in FIG. 6A, in an embodiment, there is a distance DIST1 between an actual position F1 of the physical face and the lens 121 of the image capturing apparatus 120. Light from the physical face is incident to the image capturing apparatus 120 through the lens 121, and is projected onto the photosensitive element 122 to be imaged as a face area FOF-1. As shown in FIG. 6B, in an embodiment, there is a distance DIST2 between an actual position F2 of the physical face and the lens 121 of the image capturing apparatus 120. Light from the physical face is incident to the image capturing apparatus 120 through the lens 121, and is projected onto the photosensitive element 122 to be imaged as a face area FOF-2. As shown in FIG. 6A and FIG. 6B, when the distance DIST1 is greater than the distance DIST2, the size of the face area FOF-1 is less than the size of the face area FOF-2. Therefore, there is a relative status between the sizes of the face area FOF-1, FOF-2 and the distance DIST1, DIST2. Apparently, a larger imaging size of the face area FOF in FIG. 5, (that is, a larger ratio of pixels occupied by the face area FOF in the image IMG) indicates a shorter distance between the actual position of the physical face and the electronic device 10.

Step S204: When the relative status meets the preset status, control the display interface to be in a first mode.

In an embodiment, the preset status refers to that the ratio of pixels occupied by the face area FOF in the image IMG needs to be greater than or equal to a preset threshold (in an embodiment, 40%). Therefore, when determining that the ratio of pixels occupied by the face area FOF in the image IMG is greater than 40%, the processor 160 determines that the user is using the electronic device 10, and controls the display interface 100 to be in a display mode (the first mode). The numeral 40% is merely used as an example, and the disclosure is not limited thereto.

In an embodiment, when the ratio of pixels occupied by the face area FOF in the image IMG is less than 40%, the processor 160 determines that the relative status between the face area FOF and the image IMG does not meet the preset status. Therefore, even if the image IMG captured by the image capturing apparatus 120 includes the face area FOF, the processor 160 still determines that the user is not within a proper range of using the electronic device 10, and controls the display interface 100 to be switched from the display mode (the first mode) to a power saving mode (a second mode).

It should be understood that, the manner of determining the ratio of pixels is merely an example and is not intended to limit the disclosure. In some other embodiments, the processor 160 uses a ratio of a length or a width of the face area FOF to a length or a width of the image IMG as the relative status between the face area FOF and the image IMG.

In some embodiments, when the relative status between the face area FOF and the image IMG meets the preset status, the processor 160 resets the non-operation time of the display interface 100, to keep the display interface 100 in the display mode. It should be understood that, when a sum of the non-operation time and the buffer time range exceeds a power-saving time threshold, the processor 160 controls the image capturing apparatus 120 again to capture an image, and executes the foregoing determining programs again to determine whether to remain the display interface 100 in the display mode.

It should be understood that, the foregoing operation of resetting the non-operation time is merely an example and is not intended to limit the disclosure. The display interface 100 also remains in the display mode in other feasible manners. In some embodiments, the processor 160 directly prolongs a period of time in which the display interface 100 is in the display mode. In other embodiments, the processor 160 prompts the user through display of the display interface 100, to determine, by the user, whether to remain the display of the display interface 100.

According to the electronic device and the control method disclosed above, the image of a user is obtained to determine whether the user is still awake and use the electronic device properly. Thus to further determine whether to keep the display interface on or enter a power-saving mode (e.g. the sleep mode). According to the electronic device and the control method therefor, power is effectively saved while user experience is ensured.

Although the disclosure has been described with reference to the embodiments thereof, the embodiments are not for limiting the disclosure. Persons skilled in the art may make various modifications and polishing without departing from the spirit and scope of the disclosure. Therefore, the protection scope of the disclosure shall be subject to the protection scope of the claims.

What is claimed is:

1. An electronic device, comprises:
   a display interface;
   an image capturing apparatus;
   a memory, storing a program command; and
   a processor, coupled to the display interface, the image capturing apparatus, and the memory, wherein the processor is configured to execute the program command stored in the memory to perform the following steps:
   controlling the image capturing apparatus to capture an image;
   detecting a face area in the image, wherein a relative status between the face area and the image exists;
   comparing the relative status with a preset status; and
   controlling the display interface to be in a display mode when the relative status meets the preset status;
   controlling the display interface to switch from the display mode to a power saving mode when the relative status does not meet the preset status, wherein the power saving mode comprises a sleeping mode and a dim mode;
   before controlling the image capturing apparatus to capture the image, obtaining a non-operation time of the display interface;
   when the processor determines that the non-operation time exceeds a first time length, switching the display interface from the display mode to the dim mode; and
   when the processor in the dim mode determines that the non-operation time exceeds a second time length without detecting a control behavior from a user, switching the display interface from the dim mode to the sleeping mode.

2. The electronic device according to claim 1, wherein before the step that controlling the image capturing apparatus to capture the image, the processor further performs the following steps:
   executing a detection program when the non-operation time is equal to a value obtained by subtracting a time length of a buffer time range from a power-saving time threshold.

3. The electronic device according to claim 1, wherein when the relative status meets the preset status, the processor resets the non-operation time.

4. The electronic device according to claim 1, wherein the relative status is a ratio of pixels occupied by the face area in the image.

5. The electronic device according to claim 2, wherein the detection program comprises the following steps:
   determining whether the display interface is in a lock-on image; and
   controlling the image capturing apparatus to capture the image by the processor when the display interface is not in the lock-on image.

6. The electronic device according to claim 2, wherein the detection program comprises the following steps:

determining whether the electronic device is in a low power mode; and controlling the image capturing apparatus to capture the image by the processor when the electronic device is not in the low power mode.

7. The electronic device according to claim 2, wherein the detection program comprises the following steps:

determining whether the image capturing apparatus is available; and controlling the image capturing apparatus to capture the image by the processor when the image capturing apparatus is available.

8. A control method, applied to an electronic device, wherein the electronic device comprises a display interface, and the control method comprises:

capturing an image;

detecting a face area in the image, wherein a relative status between the face area and the image exist;

comparing the relative status with a preset status; and controlling the display interface to be in a display mode when the relative status meets the preset status;

controlling the display interface to switch from the display mode to a power saving mode when the relative status does not meet the preset status, wherein the power saving mode comprises a sleeping mode and a dim mode;

before controlling the image capturing apparatus to capture the image, obtaining a non-operation time of the display interface;

when the processor determines that the non-operation time exceeds a first time length, switching the display interface from the display mode to the dim mode; and when the processor in the dim mode determines that the non-operation time exceeds a second time length without detecting a control behavior from a user, switching the display interface from the dim mode to the sleeping mode.

9. The control method according to claim 8, before the capturing the image, further comprising the following steps:

executing a detection program when the non-operation time is equal to a value obtained by subtracting a time length of a buffer time range from a power-saving time threshold.

10. The control method according to claim 9, wherein the control method further comprising the following steps:

Resetting the non-operation time when the relative status meets the preset status.

11. The control method according to claim 8, wherein the relative status is a ratio of pixels occupied by the face area in the image.

12. The control method according to claim 9, wherein the detection program comprises the following steps:

determining whether the display interface is in a lock-on image; and capturing the image when the display interface is not in the lock-on image.

13. The control method according to claim 9, wherein the detection program comprises the following steps:

determining whether the electronic device is in a low power mode; and capturing the image when the electronic device is not in the low power mode.

14. The control method according to claim 9, wherein the detection program comprises the following steps:

determining whether an image capturing apparatus of the electronic device is available; and capturing the image when the image capturing apparatus is available.

* * * * *